United States Patent
Jacobs et al.

(10) Patent No.: US 11,279,393 B2
(45) Date of Patent: Mar. 22, 2022

(54) INNER CAM ASSEMBLY FOR STEERING RAKE ADJUSTMENT ASSEMBLY

(71) Applicant: Steering Solutions IP Holding Corporation, Saginaw, MI (US)

(72) Inventors: Ethan S. Jacobs, Kawkawlin, MI (US); Randy W. Jones, North Branch, MI (US); Peter A. Gembrowski, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 35 days.

(21) Appl. No.: 16/861,487

(22) Filed: Apr. 29, 2020

(65) Prior Publication Data

US 2021/0339791 A1 Nov. 4, 2021

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS

| | | | | |
|---|---|---|---|---|
| 5,481,938 A * | 1/1996 | Stuedemann | ........... | B62D 1/184 280/775 |
| 5,598,741 A * | 2/1997 | Mitchell | ............... | B62D 1/184 74/493 |
| 6,695,350 B2 * | 2/2004 | Uphaus | ................... | B62D 1/184 280/775 |
| 7,010,996 B2 * | 3/2006 | Schick | .................. | B62D 1/184 280/775 |
| 7,267,025 B2 * | 9/2007 | Ko | ......................... | B62D 1/184 74/493 |
| 7,415,908 B2 * | 8/2008 | Zernickel | .............. | B62D 1/184 280/775 |
| 7,878,543 B2 * | 2/2011 | Bodtker | ................. | B62D 1/184 280/775 |
| 8,590,932 B2 * | 11/2013 | Dietz | ..................... | B60R 21/09 280/775 |
| 8,689,660 B2 * | 4/2014 | Okada | ................... | B62D 1/184 74/493 |
| 8,991,863 B2 * | 3/2015 | Hahn | ..................... | B62D 1/184 280/775 |
| 9,032,835 B2 * | 5/2015 | Davies | .................. | B62D 1/184 74/493 |
| 9,120,502 B2 * | 9/2015 | Mihara | .................. | B62D 1/189 |
| 9,150,241 B2 * | 10/2015 | Nakazato | ............... | B62D 1/184 |
| 9,308,931 B2 * | 4/2016 | Hahn | .................... | F16H 25/186 |
| 9,522,693 B2 * | 12/2016 | Tomaru | .................. | B62D 1/187 |
| 9,758,188 B1 * | 9/2017 | Buzzard | ................. | B62D 1/184 |

(Continued)

*Primary Examiner* — Laura Freedman
(74) *Attorney, Agent, or Firm* — Dickinson Wright PLLC

(57) ABSTRACT

A steering column assembly includes a jacket pivotable about a rake axis. The steering column assembly also includes a rake adjustment assembly that includes a lever rotatable to lock and unlock the rake adjustment assembly. The rake adjustment assembly also includes a lever cam operatively coupled to, or integrally formed with, the lever. The rake adjustment assembly further includes an inner cam assembly in contact with the lever cam, wherein the inner cam assembly is formed of two different materials.

15 Claims, 4 Drawing Sheets

(56) References Cited

U.S. PATENT DOCUMENTS

| | | | | |
|---|---|---|---|---|
| 9,828,017 B2* | 11/2017 | Maniwa | ............... | B62D 1/184 |
| 9,849,905 B2* | 12/2017 | Anspaugh | ............ | B62D 1/184 |
| 10,189,497 B2* | 1/2019 | Butler | ................... | B62D 1/187 |
| 10,246,118 B2* | 4/2019 | Baumeister | ............ | B62D 1/19 |
| 10,752,279 B2* | 8/2020 | Dubay | .................. | B62D 1/184 |
| 10,913,483 B2* | 2/2021 | Huber | ................... | B62D 1/195 |
| 2005/0047701 A1* | 3/2005 | Schick | ................. | F16C 33/543 |
| | | | | 384/623 |
| 2006/0273567 A1* | 12/2006 | Fix | ........................ | B62D 1/184 |
| | | | | 280/775 |
| 2009/0019963 A1* | 1/2009 | Hubrecht | .............. | B62D 1/184 |
| | | | | 74/493 |
| 2018/0072340 A1* | 3/2018 | Streng | ................... | B62D 1/184 |
| 2020/0406951 A1* | 12/2020 | Lingemann | ........... | B62D 1/187 |
| 2021/0094604 A1* | 4/2021 | Gembrowski | ........ | B62D 1/187 |

* cited by examiner

INNER CAM ASSEMBLY FOR STEERING RAKE ADJUSTMENT ASSEMBLY

FIELD OF THE INVENTION

The disclosure herein relates to steering systems and, more particularly, to a rake lock mechanism for vehicle steering systems.

BACKGROUND

Vehicle steering columns are often adjustable in a substantially vertical direction for driver convenience and preference. This adjustability is referred to as rake adjustment of the steering column. Manual rake adjustment assemblies include a rake lever that is moveable to selectively lock and unlock a locking mechanism.

In some rake lever assemblies, a powdered metal cam system is used. The inner cam is a large piece of powdered metal that has a high lift profile. One issue with this design is the high lift. Through the powdered metal manufacturing process, the inner cam may have a low density on the surface of the inner cam. This will increase the chances for operability, such as fracture during normal use, and also affects the hardness of the surface of the inner cam. Cams should have a hard outer surface so that through many cycles of locking and unlocking, there is little wear. There is currently no clear solution to the above-described density and durability issues for a high lift powdered metal inner cam.

SUMMARY OF THE DISCLOSURE

According to one aspect of the disclosure, a steering column assembly includes a jacket pivotable about a rake axis. The steering column assembly also includes a rake adjustment assembly that includes a lever rotatable to lock and unlock the rake adjustment assembly. The rake adjustment assembly also includes a lever cam operatively coupled to, or integrally formed with, the lever. The rake adjustment assembly further includes an inner cam assembly in contact with the lever cam, wherein the inner cam assembly is formed of two different materials.

According to another aspect of the disclosure, an inner cam assembly comprising includes a housing defining a plurality of apertures. The inner cam assembly also includes a plurality of pegs, each of the plurality of pegs disposed within one of the plurality of apertures, wherein each of the plurality of pegs extend from a first end to a second end, wherein the first end includes a ramped cam surface protruding from an outer face of the housing through the respective aperture.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
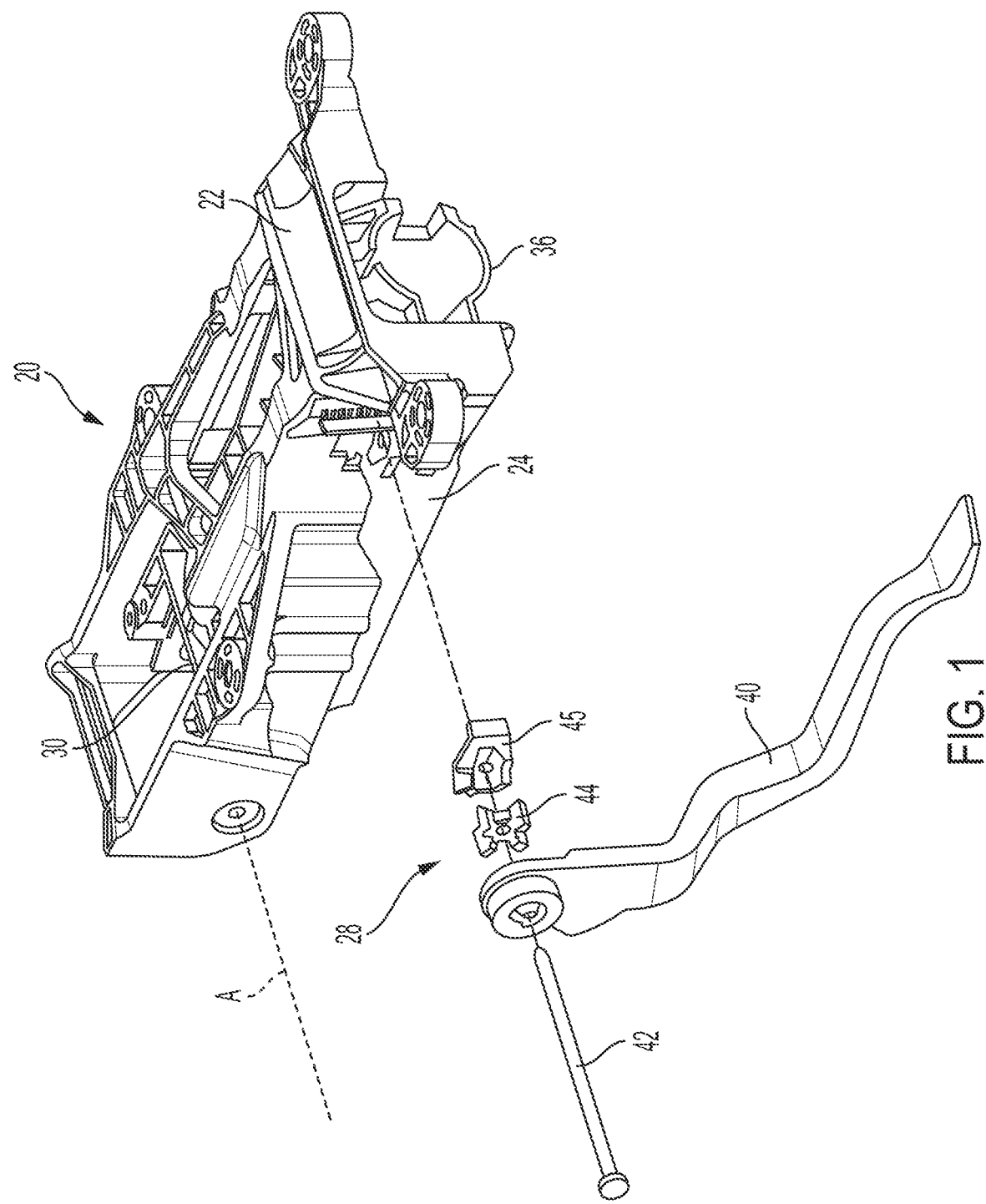
FIG. 1 is a perspective, disassembled view of a rake adjustment assembly for a steering column.

Referring now to the Figures, where the invention will be described with reference to specific embodiments, without limiting same, an exemplary embodiment of a vehicle having a steering column 20 with a rake adjustment assembly 28 is illustrated. As will be appreciated from the disclosure, the rake adjustment assembly 28 relies upon functioning of a cam assembly. The cam assembly disclosed herein is durable and reliable, while integrating a number of functional features.

The steering column 20 includes a support structure 22, a lower jacket 24, an upper jacket (not shown), and the rake adjustment assembly 28. The support structure 22 may be stationary and adapted to rigidly attach to a structure (e.g., dash) of a vehicle. A forward end portion 30 of the lower jacket 24 is pivotally attached to a stationary structure (not shown) of the vehicle for pivoting about a pivot axis A. The upper jacket is telescopically supported by the lower jacket 24 such that both co-extend along a common axis orientated substantially normal to the pivot axis. The upper jacket axially projects outward from a rearward end portion 36 of the lower jacket 24, and is adapted to axially adjust between retracted and extended positions with respect to the lower jacket 24 for the convenience and/or comfort of a vehicle operator. A steering shaft (not shown) is supported in part by the upper jacket for rotation, and projects axially rearward from the upper jacket for engagement to a steering wheel (not shown).

Where the telescopic adjustment of the upper and lower jacket is substantially horizontal and, where the steering column is so configured, generally functions to adjust the steering wheel rearward toward the vehicle operator and forward away from the vehicle operator, the rake adjustment assembly 28 is adapted to adjust the vertical position (i.e., rake position) of the steering wheel by pivoting the jackets. In other words, the embodiments disclosed herein may be utilized in a steering column that has telescoping and/or a rake adjustment capabilities.

The rake adjustment assembly 28 includes a lever 40, a pin 42 (e.g., bolt), a lever cam 44, and an inner cam assembly 45. Other components of the rake adjustment assembly are typically present. The pin 42 extends through the lever 40, the lever cam 44 and the inner cam assembly 45. During operation, actuation of the lever 40 causes the pin 42 to rotate the lever cam 44, which axially biases the inner cam assembly 45. The rotation of the pin 42, and the movement of the inner cam assembly 45 causes the rake assembly 28 to switch between a locked position, and an unlocked position by selectively engaging or disengaging various components of the rake adjustment assembly 28 which are operatively coupled to, or integrally formed with, the support structure 22.

Figure 3:
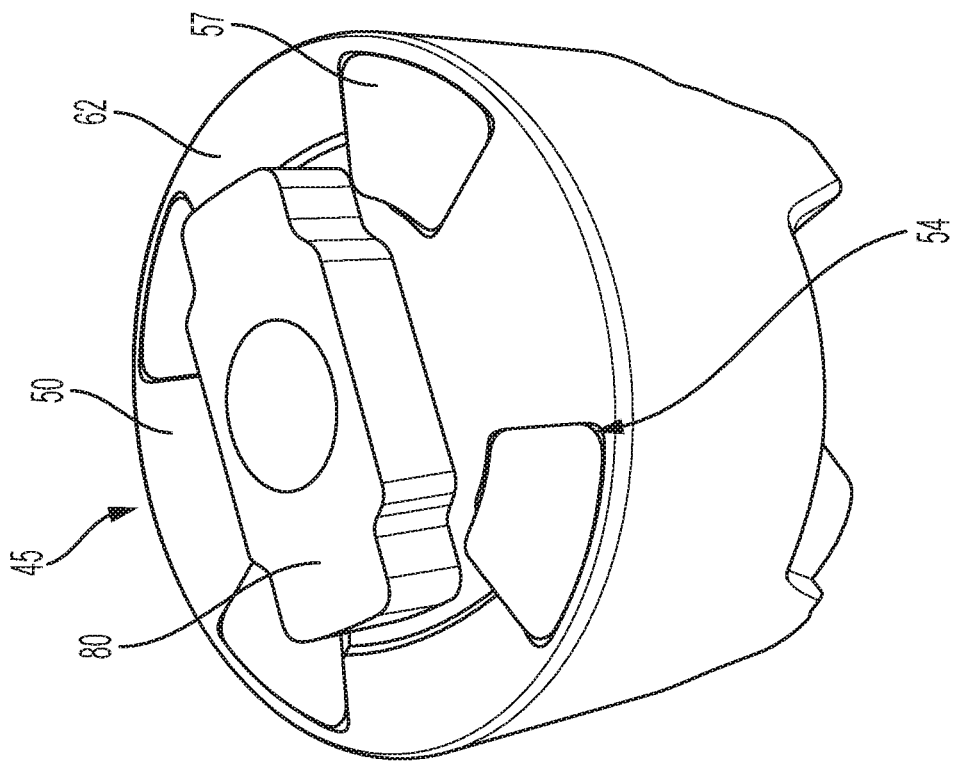
FIG. 3 is a perspective view of an inner side of the inner cam assembly.
Figure 2:
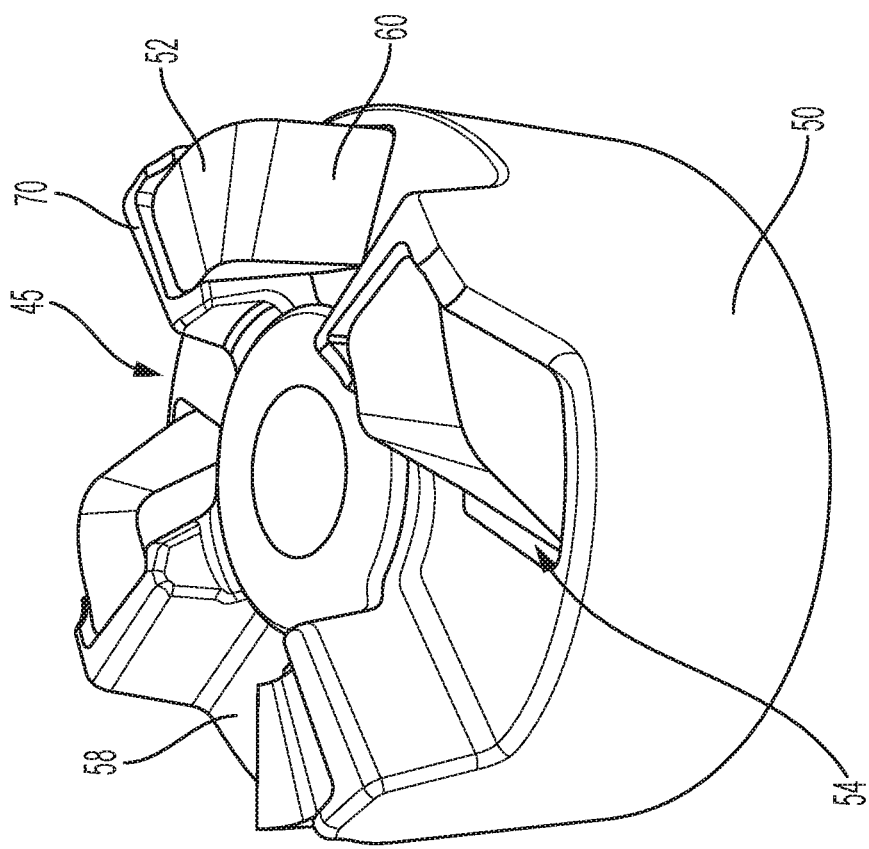
FIG. 2 is a perspective view of an outer side of an inner cam assembly.

Referring now to FIGS. 2 and 3, the inner cam assembly 45 is illustrated in greater detail. The inner cam assembly 45 includes a housing 50 and at least one peg 52, with the peg(s)

52 being disposed within respective apertures 54 defined by the housing 50. As shown in the illustrated embodiment, a plurality of apertures 54 and corresponding pegs 52 may be provided. Although four pegs 52 are shown in the illustrated embodiment, it is to be appreciated that a greater or fewer number of pegs may be present in some embodiments.

The housing 50 and the pegs 52 are separate components and are formed of different materials. In particular, the housing 50 is formed of plastic and the pegs 52 are formed of a metallic material in some embodiments. The general shape of the overall inner cam assembly 45 is similar to a single, integrally formed inner cam formed with a powdered metal manufacturing process, but the disclosed embodiments allow the density of the inner cam assembly 45 to be controlled much better than previous high lift cam designs. While the pegs 52 are shown and described herein as being separate components, it is contemplated that the pegs 52 may be joined by a base in some embodiments.

Figure 7:
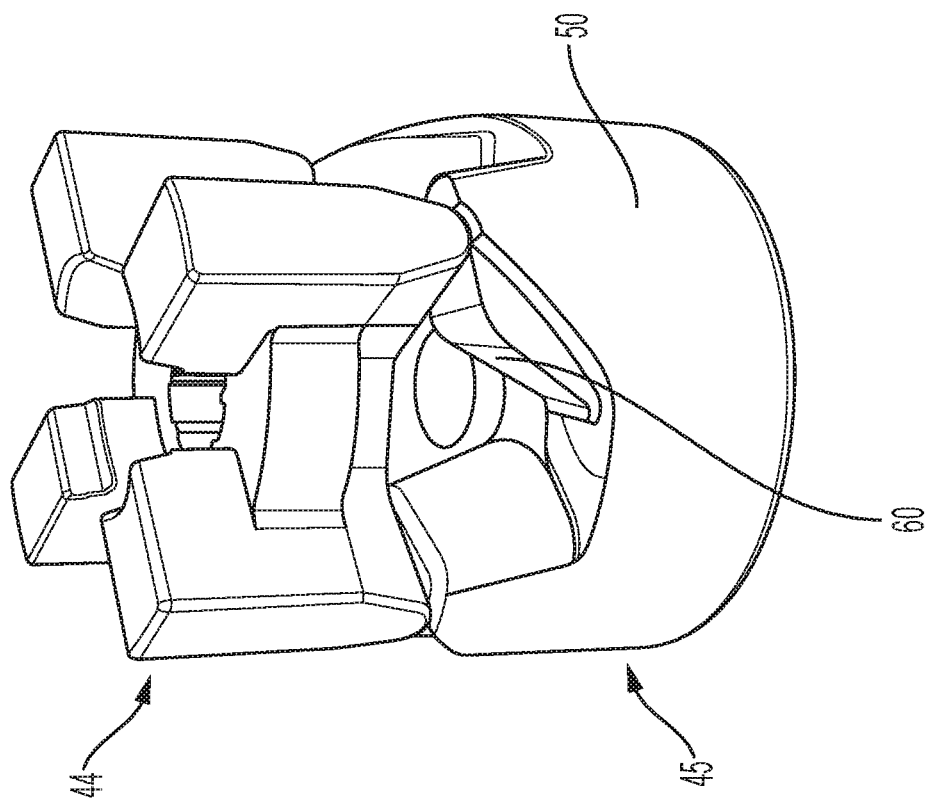
FIG. 7 is a perspective view of the inner cam assembly interfacing with a lever cam.
Figure 6:
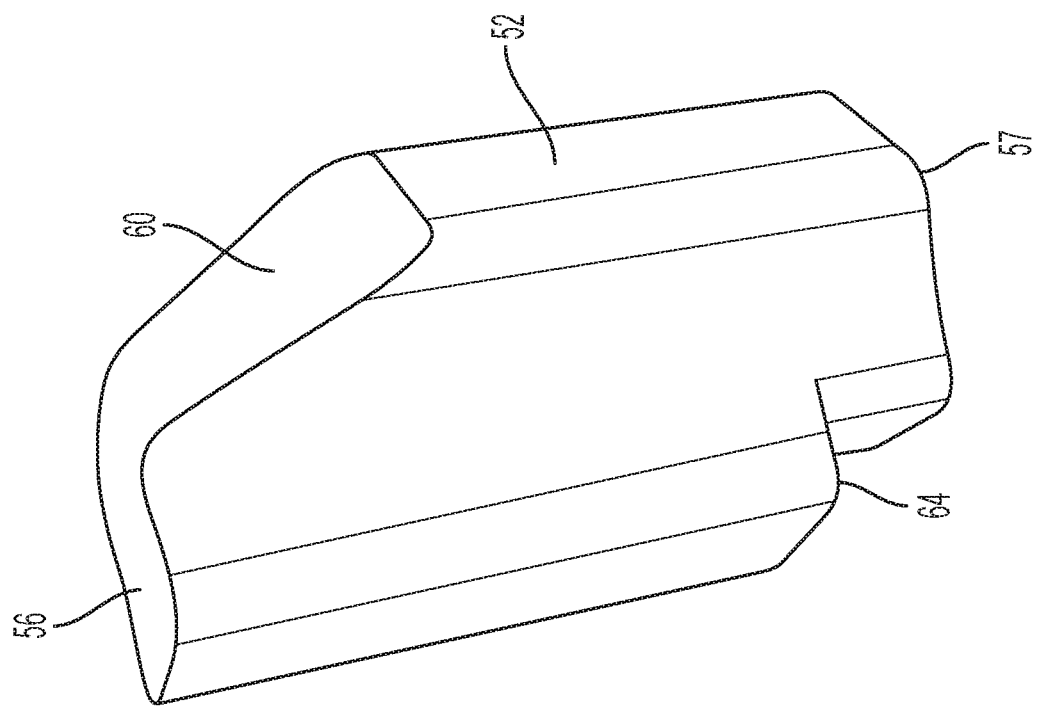
FIG. 6 is a perspective view of a peg of the inner cam assembly.

One of the pegs 52 is shown in greater detail in FIG. 6. Each peg 52 extends from a first end 56 to a second end 57. The first end 56 of each of the pegs 52 protrudes through an outer face 58 of the housing 50 (FIG. 2). The first end 56 of the pegs 52 includes a ramped portion 60 that defines a cam interface with the lever cam 44, as shown in FIG. 7. The second end 57 of the pegs 52 is substantially flush with an inner face 62 of the housing 50 (FIG. 3). The second end 57 of the pegs 52 is positioned to be in contact with a rake bracket of the steering column in an assembled condition. The pegs 52 are held in place by engagement of the second end 57 with the rake bracket and a tensioning provided by the pin (e.g., rake bolt) throughout the assembly.

Figure 5:
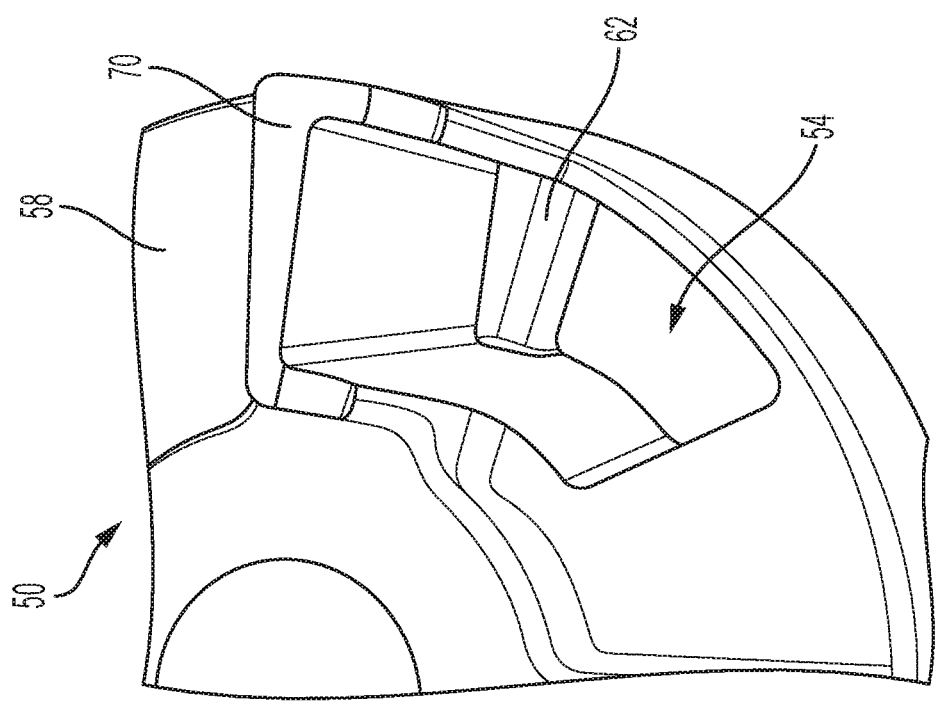
FIG. 5 is an enlarged, perspective view of an aperture of the housing.
Figure 4:
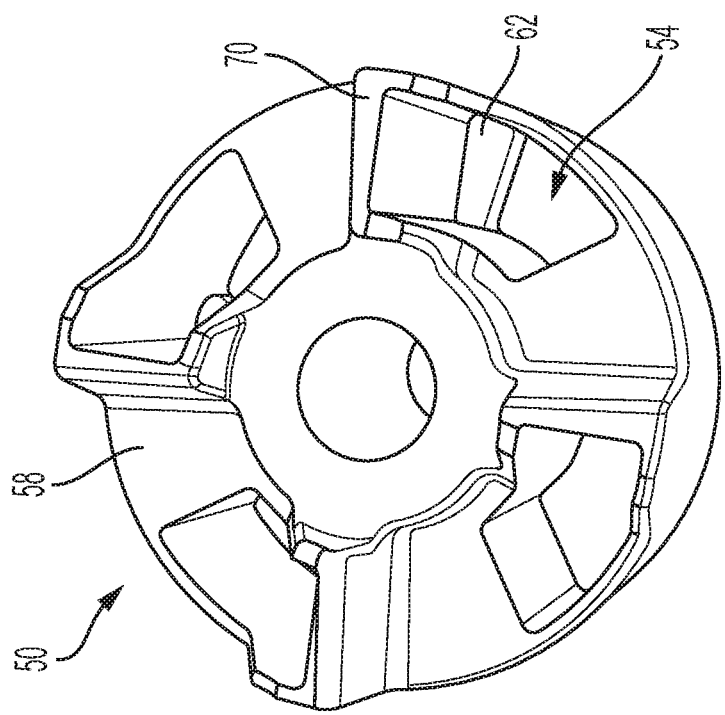
FIG. 4 is a perspective view of a housing of the inner cam assembly.

FIGS. 4 and 5 illustrate the housing 50 with the pegs 52 removed to show the apertures 54 in greater detail. As shown, the apertures 54 are sized and formed of a geometry that corresponds to an outer geometry of the pegs 52. The pegs 52 are inserted to a controlled position based on a position locating feature 62 that the housing 52 includes. In the illustrated embodiment, the position locating feature 62 is a ledge that protrudes into the aperture 54. The pegs 52 are inserted into the apertures 54 by inserting the second end 57 of the peg 52 into the outer face 58 of the housing 50. The pegs 52 are slid through the aperture in this direction until a cutout wall 64 (FIG. 6) of the peg 52 engages the position locating feature 62 (e.g., ledge) of the housing 50. This relationship defines a fully inserted position of the peg 52 within the aperture 54, thereby avoiding over or under insertion of the pegs 52. It is contemplated that alternative embodiments of the position locating feature 62 may be provided. The pegs 52 are rigidly held in the apertures 54 via press fit in some embodiments to maintain desired position of the pegs 52 during assembly and in operation.

As shown in FIGS. 2-5, the housing 50 includes a respective rotational stop 70 proximate each aperture 54. The rotational stop 70 is a portion of the housing 50 that extends away from the outer face 58 with a substantially U-shaped cross-section. The rotational stop 70 extends to surround a portion of the first end 56 of the peg 52. In some embodiments, the rotational stop 70 extends to a length that is substantially equal to the first end 56 of the peg 52, while other embodiments may include a shorter length. The wall of the rotational stop 70 defines a rotational limit for relative rotation between the lever cam 44 and the inner cam assembly 45.

Referring now to FIG. 3, a protrusion 80 of the housing 50 extends away from the inner face 62. The protrusion 80 has a substantially rectangular cross-section, but alternative geometries are contemplated. The protrusion interacts with a rake slot to slide up and down within the rake slot. As discussed above, the housing 50 is formed of plastic in some embodiments. In such embodiments, the plastic protrusion 80 provides a rake travel stop, a rake bumper, a lever unlock noise dampener, and an anti-rotation feature for the inner cam assembly 45 in the rake slot.

The inner cam assembly 45 disclosed herein is a hybrid material assembly that provides metallic pegs 52 with a cam profile to save on cost of the assembly 45 and improve part density and wear capability. The cam itself, an anti-rotation/rotational stop feature, a rake travel stop, and a travel bumper are all advantageously integrated into one component.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
 a jacket pivotable about a rake axis; and
 a rake adjustment assembly comprising:
  a lever rotatable to lock and unlock the rake adjustment assembly;
  a lever cam operatively coupled to, or integrally formed with, the lever; and
  an inner cam assembly in contact with the lever cam, wherein the inner cam assembly is formed of two different materials, wherein the inner cam assembly comprises:
   a housing formed of a first material and defining a plurality of apertures; and
   a plurality of pegs formed of a second material, each of the plurality of pegs disposed within one of the plurality of apertures,
   wherein each of the plurality of pegs extends from a first end to a second end, wherein the first end includes a ramped cam surface engaged with the lever cam and protrudes from an outer face of the housing through the respective aperture.

2. The steering column assembly of claim 1, wherein the first material is plastic and the second material is a metal.

3. The steering column assembly of claim 1, wherein the second end of each of the plurality of pegs is flush with an inner face of the housing.

4. The steering column assembly of claim 1, wherein the second end of each of the plurality of pegs is in contact with a rake bracket.

5. The steering column assembly of claim 1, wherein the housing includes a protrusion extending from an inner face of the housing, the protrusion disposed within a rake slot of a rake bracket to define a rake travel stop and a rake bumper.

6. A steering column assembly comprising:
 a jacket pivotable about a rake axis; and
 a rake adjustment assembly comprising:
  a lever rotatable to lock and unlock the rake adjustment assembly;
  a lever cam operatively coupled to, or integrally formed with, the lever; and an inner cam assembly in contact with the lever cam, wherein the inner cam assembly is formed of two different materials, wherein the inner cam assembly comprises:
  a housing formed of a first material and defining a plurality of apertures; and
  a plurality of pegs formed of a second material, each of the plurality of pegs disposed within one of the plurality of apertures, wherein the housing includes a plurality of rotational travel stops for the lever cam, wherein each of the rotational travel stops includes a wall extending away from an outer face of the housing, wherein each of the rotational travel stops has a substantially U-shaped cross-section along at least a length of the rotational travel stop to partially surround a respective one of the plurality of pegs.

7. A steering column assembly comprising:
a jacket pivotable about a rake axis; and
a rake adjustment assembly comprising:
  a lever rotatable to lock and unlock the rake adjustment assembly;
  a lever cam operatively coupled to, or integrally formed with, the lever; and
  an inner cam assembly in contact with the lever cam, wherein the inner cam assembly is formed of two different materials, wherein the inner cam assembly comprises:
    a housing formed of a first material and defining a plurality of apertures; and
    a plurality of pegs formed of a second material, each of the plurality of pegs disposed within one of the plurality of apertures, wherein the housing includes a position control feature extending into each of the plurality of apertures, wherein the position control feature defines a full insertion position of the pegs within each aperture upon contact between the position control feature and a portion of the respective peg.

8. An inner cam assembly comprising:
a housing defining a plurality of apertures; and
a plurality of pegs, each of the plurality of pegs disposed within one of the plurality of apertures, wherein each of the plurality of pegs extend from a first end to a second end, wherein the first end includes a ramped cam surface protruding from an outer face of the housing through the respective aperture, wherein the housing includes a protrusion extending from an inner face of the housing, the protrusion disposed within a rake slot of a rake bracket to define a rake travel stop and a rake bumper.

9. The inner cam assembly of claim 8, wherein the housing is formed of a first material and the plurality of pegs are formed of a second material.

10. The inner cam assembly of claim 9, wherein the first material is plastic and the second material is metal.

11. The inner cam assembly of claim 8, wherein the second end of each of the plurality of pegs is flush with an inner face of the housing.

12. The inner cam assembly of claim 8, wherein the second end of each of the plurality of pegs is in contact with a rake bracket.

13. An inner cam assembly comprising:
a housing defining a plurality of apertures; and
a plurality of pegs, each of the plurality of pegs disposed within one of the plurality of apertures, wherein each of the plurality of pegs extend from a first end to a second end, wherein the first end includes a ramped cam surface protruding from an outer face of the housing through the respective aperture, wherein the housing includes a plurality of rotational travel stops, each of the plurality of rotational travel stops having a wall extending away from an outer face of the housing.

14. The inner cam assembly of claim 13, wherein each of the rotational travel stops has a substantially U-shaped cross-section along at least a length of the rotational travel stop to partially surround a respective one of the plurality of pegs.

15. An inner cam assembly comprising:
a housing defining a plurality of apertures; and
a plurality of pegs, each of the plurality of pegs disposed within one of the plurality of apertures, wherein each of the plurality of pegs extend from a first end to a second end, wherein the first end includes a ramped cam surface protruding from an outer face of the housing through the respective aperture, wherein the housing includes a position control feature extending into each of the plurality of apertures, wherein the position control feature defines a full insertion position of the pegs within each aperture upon contact between the position control feature and a portion of the respective peg.

* * * * *